US012275264B2

(12) United States Patent
Friese et al.

(10) Patent No.: US 12,275,264 B2
(45) Date of Patent: Apr. 15, 2025

(54) BOOKBINDING MACHINE WITH MULTIPLE ENDLESS CONVEYORS IN WRAP-AROUND SUCCESSION

(71) Applicant: MECCANOTECNICA S.P.A., Gazzaniga (IT)

(72) Inventors: Thomas Friese, Leipzig (DE); Frank Sommerer, Großpösna (DE)

(73) Assignee: MECCANOTECNICA S.P.A., Gazzaniga (IT)

( * ) Notice: Subject to any disclaimer, the term of this patent is extended or adjusted under 35 U.S.C. 154(b) by 0 days.

(21) Appl. No.: 18/562,434

(22) PCT Filed: Jun. 20, 2022

(86) PCT No.: PCT/EP2022/066753
§ 371 (c)(1),
(2) Date: Nov. 20, 2023

(87) PCT Pub. No.: WO2022/268734
PCT Pub. Date: Dec. 29, 2022

(65) Prior Publication Data
US 2024/0286426 A1 Aug. 29, 2024

(30) Foreign Application Priority Data
Jun. 22, 2021 (IT) ........................ 102021000016385

(51) Int. Cl.
*B42C 19/08* (2006.01)

(52) U.S. Cl.
CPC .................................... *B42C 19/08* (2013.01)

(58) Field of Classification Search
CPC ...................................................... B42C 19/08
(Continued)

(56) References Cited

U.S. PATENT DOCUMENTS

2003/0215309 A1* 11/2003 Engert .................. B42C 9/0031 412/33

FOREIGN PATENT DOCUMENTS

EP 0152158 B1 5/1988
EP 0337315 B1 1/1994
(Continued)

OTHER PUBLICATIONS

International Search Report and Written Opinion for Patent Application No. PCT/EP2022/066753 dated Oct. 13, 2022.

*Primary Examiner* — Justin V Lewis
(74) *Attorney, Agent, or Firm* — Bryan A. Santarelli; FisherBroyles, LLP

(57) ABSTRACT

A bookbinding machine (100) is proposed. The bookbinding machine (100) comprises processing stations (205*a*-205*e*) for processing book blocks (215*a*-215*d*) and transport elements (210*a*-210*d*) for transporting the book blocks (215*a*-215*d*) across them. A plurality of endless conveyors (225*a*-225*c*) are arranged in a wrap-around succession, each carrying one or more conveying elements (305*a*1,305*a*2; 305*b*;305*c*). A driving system (235-240) drives the endless conveyors (225*a*-225*c*) to cause each conveying element (305*a*1,305*a*2;305*b*;305*c*) in succession to engage a transport element (210*a*-210*d*), to convey the transport element (210*a*-0210*d*) along a transport path (220) for an active section of the corresponding endless conveyor (225*a*-225*c*) and then to disengage the transport element (210*a*-210*d*). A bookbinding plant comprising one or more of these bookbinding machines (100) is also proposed. Moreover, a corresponding method for operating a bookbinding machine (100), a computer program and a computer program product for implementing the method are proposed.

20 Claims, 7 Drawing Sheets

(58) Field of Classification Search
USPC .... 412/1, 4, 6, 9, 11, 12, 13, 14, 18, 19, 25, 412/33
See application file for complete search history.

(56) References Cited

FOREIGN PATENT DOCUMENTS

| | | | |
|---|---|---|---|
| EP | 3495156 | A1 | 6/2019 |
| EP | 3778254 | A1 | 2/2021 |
| WO | 2008012075 | A2 | 1/2008 |

* cited by examiner

BOOKBINDING MACHINE WITH MULTIPLE ENDLESS CONVEYORS IN WRAP-AROUND SUCCESSION

RELATED APPLICATION DATA

The present application is a U.S. National Stage under 35 U.S.C. 371 of International Application No. PCT/EP2022/066753, filed on 20 Jun. 2022; which claims priority to IT patent application No. 102021000016385, filed 22 Jun. 2021, the entireties of which are incorporated herewith.

TECHNICAL FIELD

The present invention relates to the bookbinding field. More specifically, this invention relates to the transport of book blocks in bookbinding machines.

BACKGROUND ART

The background of the present invention is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present invention.

Bookbinding machines of different types are commonly used in bookbinding plants to produce books at industrial level. For example, a (bookbinding) perfect-binding machine has several processing stations for performing different operations on book blocks, such as feeding, pressing, milling, applying glue, applying end-papers, applying fastening linings, applying (soft) covers and delivering. For this purpose, a transport system transports the book blocks in succession across the processing stations. Typically, the transport system comprises several transport elements (such as clamps) for transporting the book blocks individually, which clamps are mounted on an endless conveyor driving all of them together. In some processing stations (for example, for feeding the book blocks and for applying the covers), the processing of the book blocks requires stopping the clamps therein for corresponding processing times. However, in these bookbinding machines (hereafter referred to as fixed machines), since the conveyor drives all the clamps together, whenever any clamp is stopped in a processing station all the other clamps are stopped as well.

In order to have an optimal working of the processing stations, their processing times should be at least equal to corresponding optimal values, which are generally different among the processing stations. As a consequence, since when the conveyor is stopped all the clamps are in corresponding processing stations (to reduce the downtime of the perfect-binding machine), the conveyor remains so for the longest processing time of all of them (for example, the one required to feed the book blocks). This reduces a yield of the perfect-binding machine.

Alternatively, U.S. Pat. No. 7,918,635 proposes splitting the conveyor into multiple segments with corresponding linear motors (based on travelling waves/fields), which are controlled individually by a control unit of the bookbinding machine. Moreover, EP-B-2738011 proposes providing superimposed endless chains (one for each clamp) with corresponding motors that are controlled individually by a control unit of the perfect-binding machine. In both these bookbinding machines (hereafter referred to as independent machines), the clamps may be moved at will individually.

However, the linear motors or the multiple chains (with their motors) are expensive. Moreover, the individual control of the different linear motors or chains add complexity to the perfect-binding machine. This adversely affects a total cost of the perfect-binding machines and then a production cost of the books. Moreover, in the case of the multiple chains they are difficult to synchronize, the chains are coupled with the clamps at different points (requiring constructive efforts to compensate corresponding different lever effects), any supply of media (such as compressed air) is to be arranged at different levels and the manual feeding of the book blocks is critical (because while they are loaded into the clamp of a chain being stationary for this purpose the other chains are generally moving).

EP-A-0152208 instead proposes using a single chain that always moves at a constant speed; each clamp has a channel for receiving a corresponding stud integral with the chain. At some processing stations the chain perform an excursion so that each stud disengages from the corresponding clamp, which then remains stationary for the time required to perform the corresponding operations (such as for feeding the book blocks and for applying the covers). At the same time, the other clamps remain engaged with the corresponding studs so as to continue moving; particularly, the other clamps move across the remaining processing stations (such as for milling and applying glue) and the clamps following the stopped ones advance towards the corresponding processing stations. This bookbinding machine (hereafter referred to as disengagement machine) reduces the corresponding downtimes with an increase of the yield of the perfect-binding machine. However, now the clamps may only stop in some processing stations (at the positions defined by the corresponding excursions) or move at the same speed of the chain otherwise.

Moreover, EP-A-0152158 describes a bookbinding machine with means for arresting the clamp at stations, which means comprise sprockets for causing a drive chain to be disengaged from the clamp, perform an excursion and to re-engage. D2=EP-A-3495156 instead describes a bookbinding device with a control unit for calculating set values of parameters for a clamper and a processing unit on the basis of thickness information on a book body to be bound, and initially setting the clamper and the processing unit in accordance with the set values of the parameters.

SUMMARY

A simplified summary of the present invention is herein presented in order to provide a basic understanding thereof; however, the sole purpose of this summary is to introduce some concepts of the invention in a simplified form as a prelude to its following more detailed description, and it is not to be interpreted as an identification of its key elements nor as a delineation of its scope.

In general terms, the present invention is based on the idea of providing multiple endless conveyors in wrap-around succession.

Particularly, an aspect provides a bookbinding machine. The bookbinding machine comprises processing stations for processing book blocks and transport elements for transporting the book blocks across them. A plurality of endless conveyors are arranged in a wrap-around succession, each carrying one or more conveying elements. A driving system drives the endless conveyors to cause each conveying element in succession to engage a transport element, to convey the transport element along a transport path for an active section of the corresponding endless conveyor and then to disengage the transport element.

A further aspect provides a bookbinding plant comprising one or more of these bookbinding machines.

A further aspect provides a corresponding method for operating this bookbinding machine.

A further aspect provides a computer program for implementing the method.

A further aspect provides a corresponding computer program product.

More specifically, one or more aspects of the present invention are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present invention, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, such as value, content and representation). In this respect, it is expressly intended that the drawings are not necessary drawn to scale (with some details that may be exaggerated and/or simplified) and that, unless otherwise indicated, they are merely used to illustrate the structures and procedures described herein conceptually. In addition, orientations and related position references (such as upper, lower, lateral and so on) are to be understood in relation to a condition of use of the corresponding entities. Particularly.

DETAILED DESCRIPTION

Figure 1:
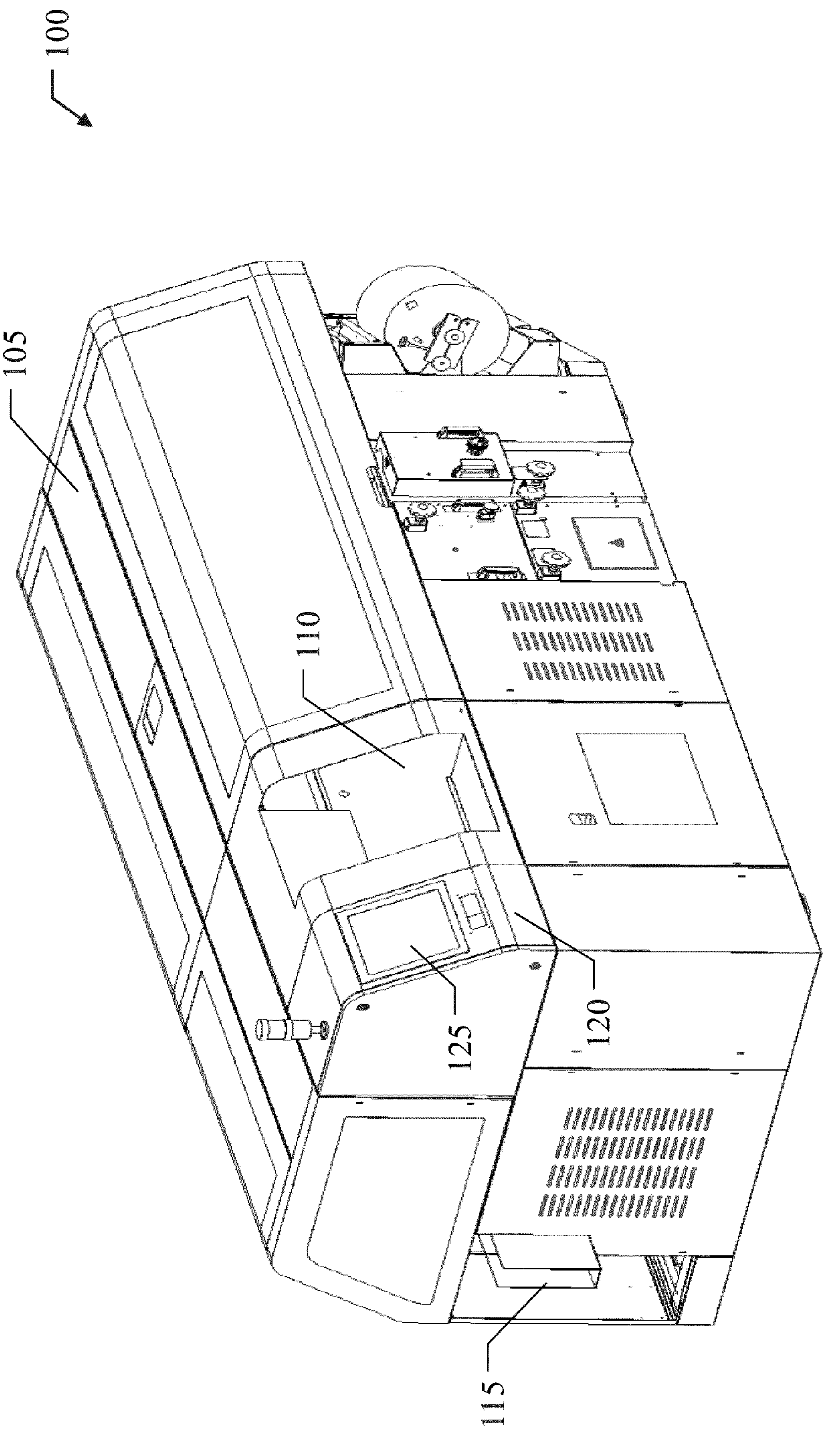
FIG. 1 shows a pictorial representation of a bookbinding machine wherein the solution according to an embodiment of the present invention may be applied.

With reference in particular to FIG. 1, a pictorial representation is shown of a bookbinding machine 100 wherein the solution according to an embodiment of the present invention may be applied.

Particularly, this is a (bookbinding) perfect-binding machine 100; the perfect-binding machine 100 is used to produce books in bookbinding plants, and particularly to apply a fastening lining and/or a (soft) cover to corresponding book blocks, not shown in the figure (each formed by a block of signatures or sheets that are either bound together, for example, sewn or glued, or not).

The perfect-binding machine 100 comprises the following components. A casing 105 protects internal parts of the perfect-binding machine 100. The casing 105 has an inlet 110 for feeding the book blocks to be processed, either automatically (from previous bookbinding machines providing the book blocks, such as sewing machines, not shown in the figure) or manually (by an operator of the perfect-binding machine 100); moreover, the casing 105 has an outlet 115 for delivering the book blocks that have been processed (for following bookbinding machines that complete the production of the corresponding books, such as case-in machines or three-knives trimming machines, not shown in the figure). A plurality of processing stations (not visible in the figure) are arranged inside the casing 105 for processing the book blocks. Particularly, the processing stations are used to feed the book blocks, to deliver the book blocks and to finish the book blocks, such as by pressing, milling, applying glue, applying end-papers, applying fastening linings, applying covers and so on. A control unit 120 (for example, an industrial PC) controls operation of the perfect-binding machine 100. Particularly, the control unit 120 has (not visible in the figure) a microprocessor or more (providing a logical capability of the control unit 120), a non-volatile memory (such as a ROM storing basic code for a bootstrap of the control unit 120), a volatile memory (such as a RAM used as a working memory by the microprocessor), a mass-memory (such as an SSD for storing programs and data) and controllers for peripherals units (such as an input unit, an output unit, a drive for reading/writing removable storage units like USB keys and so on). In this specific implementation, the peripheral units comprise a touchscreen 125 for both displaying information and entering commands/data.

Figure 2:
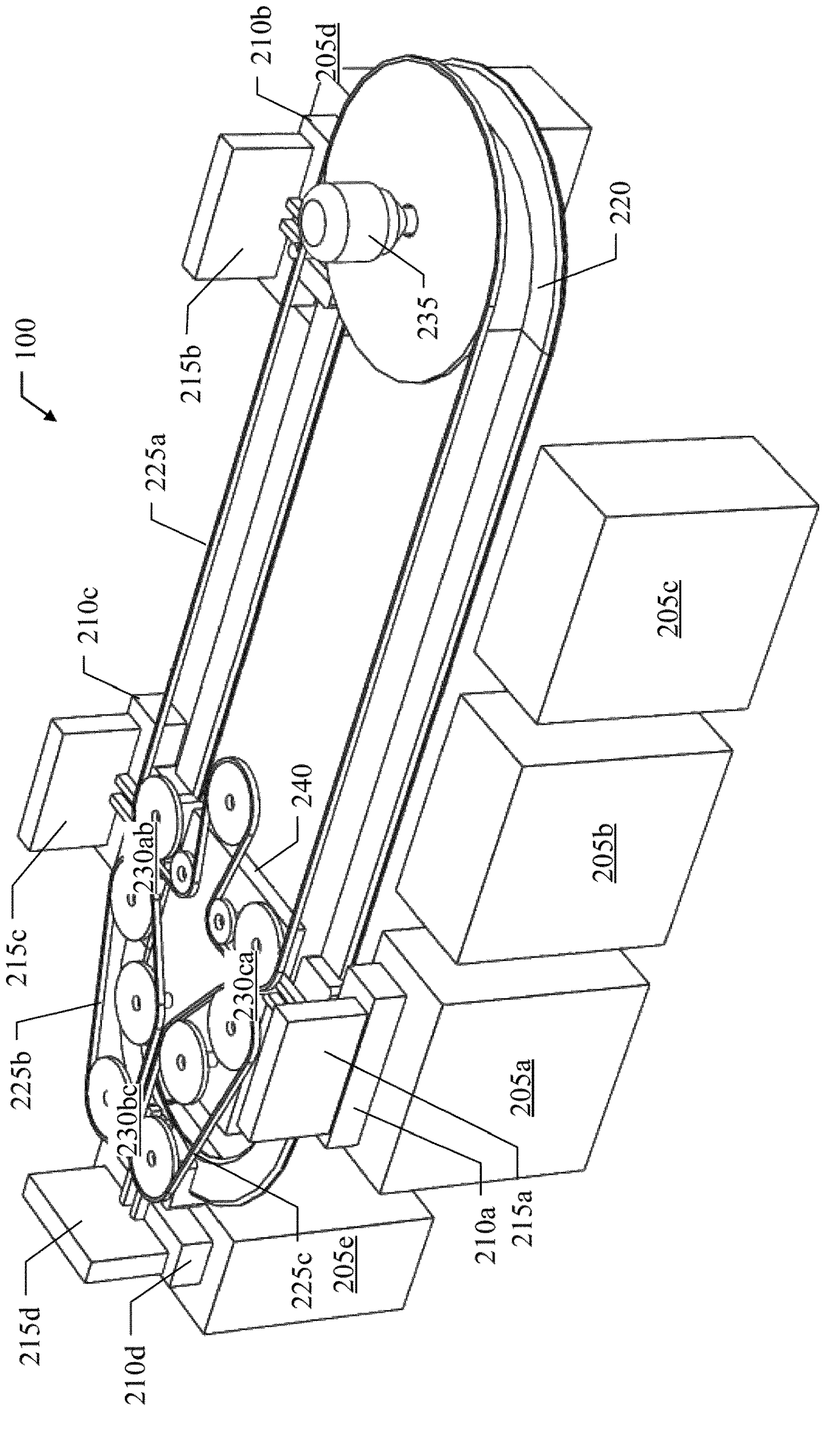
FIG. 2 shows a partially cut-away schematic representation in perspective view of the bookbinding machine according to an embodiment of the present invention.

With reference now to FIG. 2, a partially cut-away schematic representation in perspective view is shown of the bookbinding machine 100 according to an embodiment of the present invention.

Particularly, the figure shows the perfect-binding machine 100 with its processing stations now visible and identified with the references 205*a*, 205*b*, 205*c*, 205*d* and 205*e*. Multiple processing stations (referred to as stationary processing stations), such as the processing stations 205*a*, 205*d* and 205*e*, process the book blocks while they are stationery therein. For example, the processing station 205*a* is a manual feeding station that is used to feed the book blocks to be processed manually, the processing station 205*d* is a cover application station that is used to apply the covers to the book blocks and the processing station 205*e* is a delivering station that is used to deliver the book blocks that have been processed. One or more other processing stations (referred to as movement processing stations), such as the processing stations 205*b* and 205*c*, instead process the book blocks while they are moving thereacross. For example, the processing stations 205*b*,205*c* are a milling station (milling the book blocks), a gluing station (applying glue to the book blocks), a lining station (applying fastening linings to the book blocks) and so on.

A plurality of transport elements transport the book blocks individually; in the example at issue, four transport elements 210*a*, 210*b*, 210*c* and 210*d* transporting corresponding book blocks 215*a*, 215*b*, 215*c* and 215*d*, respectively, are shown. For example, these are clamps 210*a*-210*d* clamping the book blocks 215*a*-215*d* arranged vertically. Particularly, each clamp 210*a*-210*d* comprises an internal (bigger) plate and an external (smaller) plate that is movable horizontally with respect thereto (opened away from the internal plate to receive/release the book block 215*a*-215*d* and closed towards the internal plate to grasp the book block 215*a*-215*d*). The clamps 210*a*-210*d* transport the book blocks 215*a*-215*d* across the processing stations 205*a*-205*e* in a transport direction (counter-clockwise in the example at issue) passing through them in order from the (manual) feeding station 205*a* to the delivering station 205*e*. A guide 220 guides the clamps 210*a*-210*d* along a corresponding transport path (denoted with the same reference); the transport path 220 has a closed shape (for example, oval in the figure) crossing all the processing stations 205*a*-205*e*.

In the solution according to an embodiment of the present invention, a plurality of endless conveyors, for example, three (endless) chains 225*a*, 225*b* and 225*c* convey the clamps 210*a*-210*d* along the guide 220. The chains 225*a*-225*c* are arranged in a wrap-around succession, with the chain 225*b* following the chain 225*a*, the chain 225*c* following the chain 225*b* and the chain 225*a* following the chain 225*c* (along the transport direction) in the example at issue. An exchange area 230*ab*, 230*bc* and 230*ca* is then defined between each pair of adjacent chains 225*a*-225*b*, 225*b*-225*c* and 225*c*-225*a*, respectively (wherein each clamp 210*a*-210*d* is exchanged between the corresponding adjacent chains 225*a*-225*c*, as described in detail in the following). Each chain 225*a*,225*b*,225*c* is split by the corresponding pair of exchange areas 230*ca*-230*ab*,230*ab*-230*bc*,230*bc*-230*ca* into an active section and a passive section. In the active section of each chain 225*a*,225*b*,225*c*, corresponding to the transport path 220 from its (start) exchange area 230*ca*,230*ab*,230*bc* to its (end) exchange area 230*ab*,230*bc*,230*ca* in the transport direction, the chain 225*a*-225*c* acts on the clamps 210*a*-210*d* that are then transported synchronously (according to corresponding speeds); in the passive section of each chain 225*a*,225*b*, 225*c*, away from the transport path 220 from its end exchange area 230*ab*,230*bc*,230*ca* to its start exchange area 230*ca*,230*ab*,230*bc* in the transport direction, the chain 225*a*-225*c* instead does not act on the clamps 210*a*-210*d*. A driving system drives all the chains 225*a*-225*c*. For example, the driving system comprises a (common) motor 235 and a transmission system, for example, a gearbox 240. The motor 235 rotates at a certain speed (either constant or variable over time in module); the gearbox 240 transmits power from the motor 235 to each chain 225*a*-225*c* with a corresponding transmission ratio determining its (constant/variable) speed.

Figure 3:
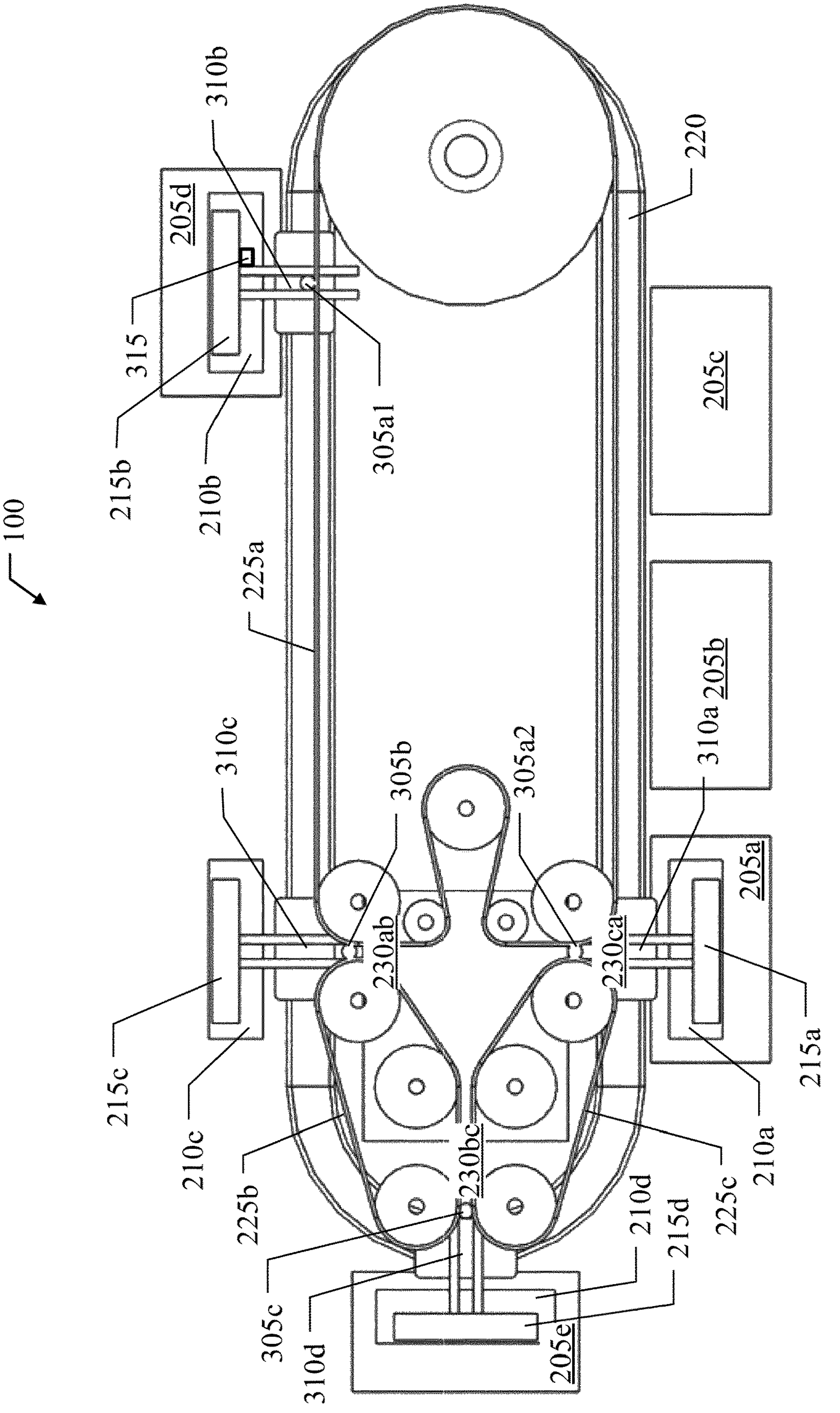
FIG. 3 shows a partially cut-away schematic representation in plant view of the bookbinding machine according to an embodiment of the present invention.

With reference now to FIG. 3, a partially cut-away schematic representation in plant view is shown of the bookbinding machine 100 according to an embodiment of the present invention.

Each chain 225*a*-225*c* carries one or more conveying elements, which are integral with the chain 225*a*-225*c* so as to move always at its speed; for example, these are pegs projecting from the chains 225*a*-225*c* (such as downwards). When the pegs of a chain 225*a*-225*c* are more than one, they are distributed uniformly along it. Particularly, in the example shown in the figure the chain 225*a* carries two pegs 305*a*1 and 305*a*2 (at opposite sides thereof), the chain 225*b* carries a single peg 305*b* and the chain 225*c* carries a single peg 305*c*.

The pegs 305*a*1,305*a*2,305*b*,305*c* are used to convey the clamps 210*a*-210*d* in succession by selectively engaging/disengaging them (with each peg 305*a*1,305*a*2,305*b*,305*c* that may convey in succession all the clamps 210*a*-210*d* or only a corresponding subset thereof). For example, for this purpose each clamp 210*a*-210*d* has a slit 310*a*-310*d* for receiving the pegs 305*a*1,305*a*2,305*b*,305*c*. The clamp 210*a*-210*d* is engaged by each peg 305*a*1,305*a*2,305*b*,305*c* when the latter is inside the slit 310*a*-310*d* moving transversally thereto. Particularly, when the peg 305*a*1,305*a*2, 305*b*,305*c* moves perpendicularly to the slit 310*a*-310*d*, it abuts against a downstream wall of the slit 310*a*-310*d* (without any relative freedom of movement); the clamp 210*a*-210*d* then moves integral with the peg 305*a*1,305*a*2, 305*b*,305*c* at its speed along the guide 220. When the peg 305*a*1,305*a*2,305*b*,305*c* moves obliquely to the slit 310*a*-310*d*, the speed of the peg 305*a*1,305*a*2,305*b*,305*c* has a component perpendicular to the slit 310*a*-310*d* (which moves the clamp 210*a*-210*d* integral with the peg 305*a*1, 305*a*2,305*b*,305*c* as above) and a component longitudinal along the slit 310*a*-310*d* (which causes the peg 305*a*1, 305*a*2,305*b*,305*c* to slide along it). Conversely, each clamp 210*a*-210*d* is disengaged from all the pegs 305*a*1,305*a*2, 305*b*,305*c* when none of them is inside the slit 310*a*-310*d* moving transversally thereto, i.e., the pegs 305*a*1,305*a*2, 305*b*,305*c* move longitudinally along and/or they are outside the slit 310*a*-310*d*. Therefore, in their movements the pegs 305*a*1,305*a*2,305*b*,305*c* do not exert any force on the clamp 210*a*-210*d* that then does not move.

Particularly, each clamp 210*a*-210*d* is engaged by a peg 305*a*1-305*a*2,305*b*,305*c* of each chain 225*a*,225*b*,225*c* at its start exchange area 230*ca*,230*ab*,230*bc*. The (engaged) clamp 210*a*-210*d* is conveyed along the active section of the chain 225*a*,225*b*,225*c* from its start exchange area 230*ca*, 230*ab*,230*bc* to its end exchange area 230*ab*,230*bc*,230*c*. The clamp 210*a*-210*d* then disengages from the peg 305*a*1-305*a*2,305*b*,305*c* at this end exchange area 230*ab*,230*bc*, 230*c* (with the peg 305*a*1-305*a*2,305*b*,305*c* that then returns free of any clamp 210*a*-210*d* along the passive section of the chain 225*a*,225*b*,225*c* from its end exchange area 230*ab*, 230*bc*,230*c* to its start exchange area 230*ca*,230*ab*,230*bc*). For example, considering the clamp 210*a* in the position shown in the figure (with similar considerations that apply to the other clamps 210*b*,210*c*), it is engaged by the peg 305*a*2 that transports it from the start exchange area 230*ca* to the end exchange area 230*ab* of the chain 225*a*, where it disengages and it is engaged by the peg 305*b* that transports it from the start exchange area 230*ab* to the end exchange area 230*bc* of the chain 225*b*, where it disengages and it is engaged by the peg 305*c* that transports it from the start exchange area 230*bc* to the end exchange area 230*ca* of the chain 225*c*, and so on.

In order to ensure continual operation of the bookbinding machine 100, its configuration has to repeat periodically. Particularly, every moving period PM, in each chain with multiple pegs each peg has to reach the previous position of a peg ahead of it, whereas in each chain with a single peg the peg has to return to the same position; in the example at issue, every moving period PM the peg 305*a*1 reaches the position of the peg 305*a*2 and the peg 305*a*2 reaches the position of the peg 305*a*1 (in the chain 225*a*), the peg 305*b* returns to its position (in the chain 225*b*) and the peg 305*c* returns to its position (in the chain 225*c*). Therefore, the speeds of the chains 225*a*-225*c* have to be:

$$v_i = \frac{L_i/n_i}{PM} = fm \cdot \frac{L_i}{n_i},$$

where $v_i$ is the speed, $L_i$ is the length and $n_i$ is the number of pegs 305*a*1,305*a*2,305*b*,305*c* of the i-th chain 225*a*-225*c*, and fm=1/PM is a (common) moving frequency. In the example at issue, the chains 225*b*,225*c* each carrying a single peg 305*b*,305*b* have a shorter (common) length L, whereas the chain 225*a* carrying two pegs 305*a*1,305*a*2 has a (longer) length equal to four times the one of the chains 225$b$,225$c$, i.e., 4·L; therefore, the chain 225$a$ has a (higher) speed $$Vh = fm \cdot \frac{4 \cdot L}{2} = 2 \cdot fm \cdot L,$$

whereas each chain 225$b$,225$c$ has a (lower) speed $$Vl = fm \cdot \frac{L}{1} = fm \cdot L = Vh/2$$

(half the one of the chain 225$a$).

The above-described solution allows using shorter chains 225$a$-225$c$ for transporting the clamps 210$a$-210$d$ along the transport path 220. As a result, the chains 225$a$-225$c$ are more accurate, less subject to mechanical stresses and more resistant to wearing (and particularly to lengthening thereof).

Moreover, the proposed structure provides high flexibility.

For example, in this way it is possible to configure the bookbinding machine 100 to have a reduced speed of the chains in critical zones. Particularly, this is the case where the chains move away from the transport path 220, especially at curved portions thereof; in fact, in this case the chains exhibit a sharp turn (with an angle higher than 90°). Therefore, the reduced speed of the chains prevents (or at least substantially reduces) vibrations of the clamps 210$a$-210$d$ caused by the disengagements from the pegs at the sharp turns. As a result, it is possible to obtain a more accurate positioning of the clamps 210$a$-210$d$ in the corresponding processing stations, with a beneficial effect on the quality of the operation performed by them on the book blocks 215$a$-215$d$. In the example at issue, this happens at the (critical) exchange area 230$bc$ in the left-side curved portion of the transport path 220, wherein the peg 305$b$ of the chain 225$b$ disengages from the clamps at the delivery station 205$e$ at reduced speed (Vl=Vh/2).

In addition or in alternative, when the chains 225$a$-225$c$ are stopped periodically (every stop period PS for processing the book block hold by the clamp in the cover application station 205$d$ whereas the other clamps are disengaged at the exchange areas 230$ab$,230$bc$,230$ca$, as described in detail in the following), it is possible to have a peg inside the slit of each disengaged clamp. For example, in the condition shown in the figure, when the clamp 210$b$ is at the cover application station 205$d$, the clamp 210$c$ is at the exchange area 230$ab$ with the peg 305$b$ inside its slit 310$c$, the clamp 210$d$ is at the exchange area 230$bc$ with the peg 305$c$ inside its slit 310$d$, and the clamp 210$a$ is at the exchange area 230$ca$ with the peg 305$a$2 inside its slit 310$a$. The pegs inside the slits of the disengaged clamps prevent (or at least substantially reduce) any movements thereof (for example, caused accidentally by operators when the bookbinding machine 100 is not working). In this way, the disengaged clamps may be maintained fixed in position even without any dedicated fixing device; this is especially important when the disengaged clamps are stopped at processing stations (as the clamps 210$d$ and 210$a$ at the processing stations 205$e$ and 205$a$, respectively, in the example at issue), since the fixed position of the clamps ensures correct processing of the corresponding book blocks. Moreover, the pegs inside the slits of the disengaged clamps facilitate the re-starting of the chains. Particularly, this makes the engagement of the pegs with the slits of the clamps more accurate and predictable, thereby reducing any wear of the side surfaces of the slits (and preventing possible block situations).

In addition or in alternative, the multiple chains 225$a$-225$c$ facilitate the addition of the (empty) exchange area 230$ab$, wherein each clamp 210$a$-210$d$ remains stationary after the cover application station 205$d$. This extends the time during which each book block 215$a$-215$d$ remains in the bookbinding machine 100 after the application of the corresponding cover. This has a positive effect on the drying of the glue, especially when using a Polyurethane Reactive (PUR) glue, since when the book blocks 215$a$-215$d$ leave the bookbinding machine 100 the glue has a higher adhesion, thereby significantly increases a quality of the corresponding books. In a different implementation (not shown in the figure) it is also possible to exploit the exchange area 230$ab$ to add a further stationary processing station. For example, this stationary processing station may be a secondary pressing station for improving the gluing of the covers, or the delivery station whereas the stationary processing stations at the exchange areas 230$bc$ and 230$ca$ may now be a manual feeding station and an automatic feeding station, respectively.

In a specific implementation, the movement processing stations 205$b$-205$c$ are arranged along straight portions of the transport path 220 (wherein the clamps 210$a$-210$d$ are engaged by the pegs(s) of the corresponding chain, the pegs 305$a$1,305$a$2 of the chain 225$a$ in the example at issue). A stationary processing station (referred to as engagement processing station), or more, is arranged at a straight portion of the transport path 220 wherein the clamps 210$a$-210$d$ are engaged by the peg(s) of the corresponding chain, the pegs 305$s$1,305$a$2 of the chain 225$a$ as well in the example at issue. In the specific example shown in the figure, this is the cover application station 205$d$. The cover application station 205$d$ is the most critical one, i.e., the one having the highest impact on the quality of the books being produced. In fact, a correct application of the corresponding covers to the book blocks 215$a$-215$d$ (in terms of either their alignment or solidity) is of the utmost importance for the resulting books. For this purpose, the cover application station 205$d$ may also have a sensor 315 (for example, based on an array of LEDs with corresponding photocells) for measuring a displacement of each book block therein with respect to the cover (for example, longitudinally). The other stationary processing stations 205$a$ and 205$e$ (referred to as disengagement processing stations) are instead arranged at corresponding exchange areas 230$ca$ and 230$bc$, respectively, wherein the clamps 210$a$-210$d$ disengage from the corresponding pegs 305$b$ and 305$c$, respectively.

With reference now to FIG. 4A-FIG. 4D together with FIG. 3, qualitative time diagrams are shown of operation of the bookbinding machine 100 according to an embodiment of the present invention.

The diagrams plot speed (i.e., its module, in arbitrary units on the ordinate axis) against time (in arbitrary units on the abscissa axis) of different components of the perfect-binding machine 100 of above.

Figure 4A:
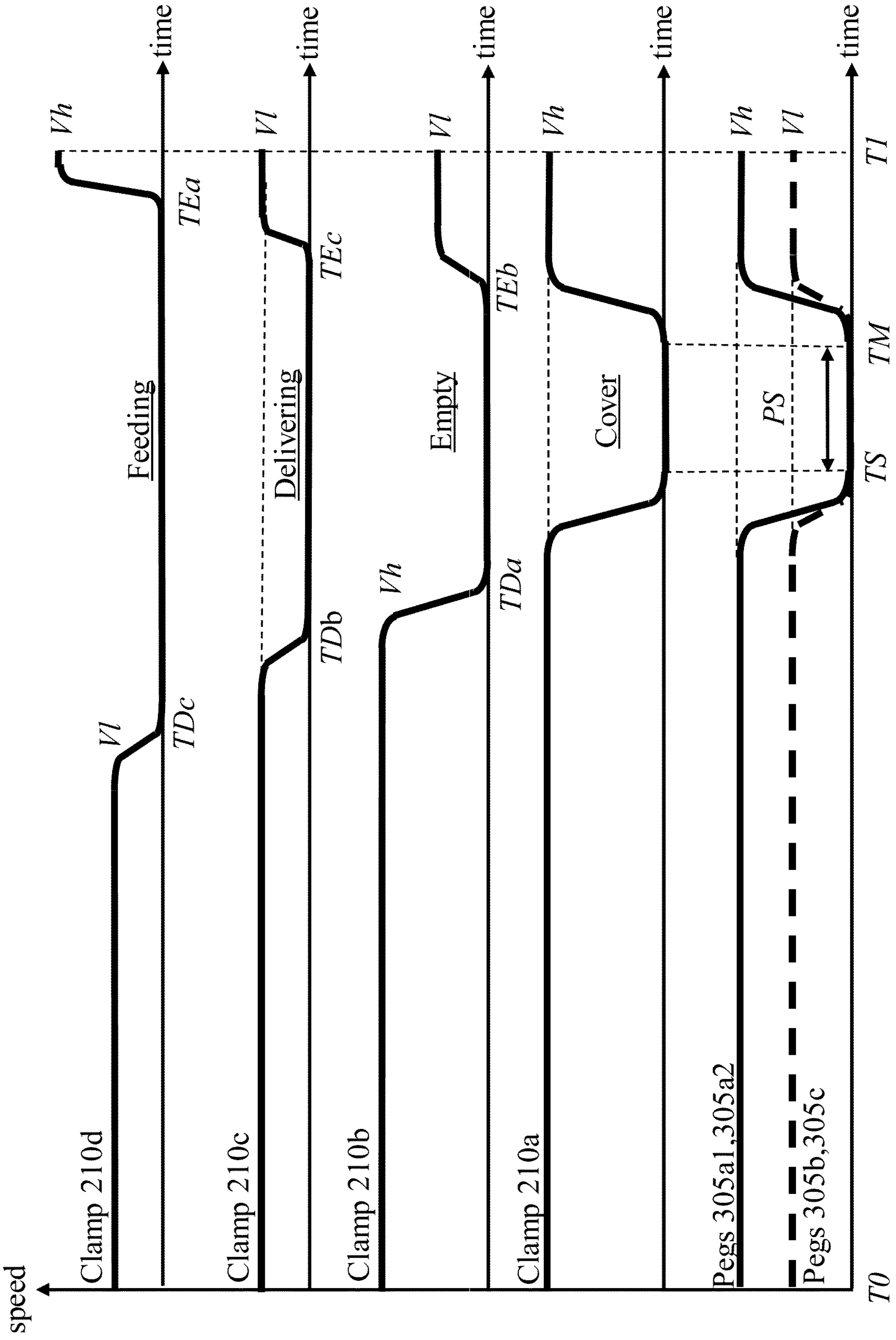
FIG. 4A-FIG. 4D show qualitative time diagrams of operation of the bookbinding machine according to an embodiment of the present invention.

Starting from FIG. 4A, the driving system drives the chains 225$a$-225$c$, and then their pegs 305$a$1,305$a$2,305$b$,305$c$, with the same motion low, apart for the different speeds Vh,Vl as defined by its gearbox (shown in solid line for the pegs 305$a$1,305$a$2 of the chain 225$a$ with the speed Vh and in dashed line for the pegs 305$b$,305$c$ of the chains 225$b$,225$ca$ with the speed Vl). Taking as a reference a peg of the chain 225*a*, such as the peg 305*a*2, a start condition is considered at a time TO wherein the peg 305*a*2 is between the exchange area 230*ca* and the movement processing station 205*b*. The driving system moves the chain 225*a* at the speed Vh and the chains 225*b*-225*c* at the speed Vl up to when the peg 305*a*2 reaches the (engagement) cover application station 205*d*; at this point, the driving system decelerates down to stop the chains 225*a*-225*c* at a (stop) time TS. The driving system remains so for the time required to process the book block in the cover application station 205*d*; thereafter, the driving system accelerates at a (moving) time TM up to when the chain 225*a* reaches the same speed Vh and the chains 225*b*-225*c* reach the same speed Vl. The driving system then moves the chain 225*a* at this speed Vh and the chains 225*b*-225*c* at this speed Vl up to a time TI, when the other peg 305*a*1 of the chain 225*a* reaches the same position where the peg 305*a*2 was at the time TO.

At the same time, the clamps 210*a*-210*d* move according to the movement of the pegs 305*a*1,305*a*2,305*b*,305*c* and to their engagement therewith; for the sake of simplicity, the case is considered wherein the chains 225*a*-225*c* in their active sections are coincident with the transport path 220, so that the clamps 210*a*-210*d* move therein integral with the pegs 305*a*1,305*a*2,305*b*,305*c* engaging them at the same speeds Vh,Vl thereof.

Particularly, the start condition is considered wherein the clamp 210*a* at the time TO is engaged by the peg 305*a*2. Therefore, the clamp 210*a* follows the same motion law of the peg 305*a*2, i.e., it moves at the speed Vh, decelerates down to stop at the time TS at the cover application station 205*d*, remains stationary therein and accelerates at the time TM up to return to the speed Vh.

The clamp 210*b* at the time TO is engaged by the peg 305*a*1 between the cover application station 205*d* and the exchange area 230*ab*. Therefore, the clamp 210*b* moves at the same speed Vh of the peg 305*a*2 up to a time TDa, preceding the time TS, when the peg 305*a*1 reaches the (empty) exchange area 230*ab* and disengages therefrom (thereby decelerating down to stop). The clamp 210*b* remains stationary in the exchange area 230*ab* up to a time TEb, following the time TM, when the peg 305*b* of the next chain 225*b* engages it, so that the clamp 210*b* accelerates up to reach its speed Vl.

The clamp 210*c* at the time TO is engaged by the peg 305*b* between the exchange area 230*ab* and the exchange area 230*bc*. Therefore, the clamp 210*c* moves at the same speed Vl of the peg 305*b* up to a time TDb, preceding the time TS, when the peg 305*b* reaches the exchange area 230*bc* at the (disengagement) delivery station 205*e* and disengages therefrom (thereby decelerating down to stop). The clamp 210*c* remains stationary in the delivery station 205*e* up to a time TEc, following the time TM, when the peg 305*c* of the next chain 225*c* engages it, so that the clamp 210*c* accelerates up to reach its speed Vl.

The clamp 210*d* at the time TO is engaged by the peg 305*c* between the exchange area 230*bc* and the exchange area 230*ca*. Therefore, the clamp 210*d* moves at the same speed Vl of the peg 305*c* up to a time TDc, preceding the time TS, when the peg 305*c* reaches the exchange area 230*ca* at the (disengagement) feeding station 205*a* and disengages therefrom (thereby decelerating down to stop). The clamp 210*d* remains stationary in the feeding station 205*a* up to a time TEa, following the time TM, when the peg 305*a*1 of the next chain 225*a* engages it, so that the clamp 210*d* accelerates up to reach its speed Vh.

The driving system (repeatedly) stops for corresponding stop periods PS(from the time TS to the time TM. In each stop period PS, a clamp is engaged at an engagement processing station; at the same time, the other clamps are disengaged at the exchange areas (and then at the corresponding disengagement processing stations, when present). For example, in the condition shown in FIG. 3, the clamp 210*b* is at the (engagement) cover application station 205*d* engaged by the peg 305*a*1, the clamp 210*c* is disengaged at the (empty) exchange area 230*ab*, the clamp 210*d* is disengaged at the (disengagement) delivering station 205*e* and the clamp 210*a* is disengaged at the (disengagement) feeding station 205*a*. As described in detail in the following, in this way it is possible to control the clamp in the engagement processing station at will via the driving system, without any repercussion on the clamps in the disengagement processing stations (being instead disengaged therefrom).

Figure 4B:
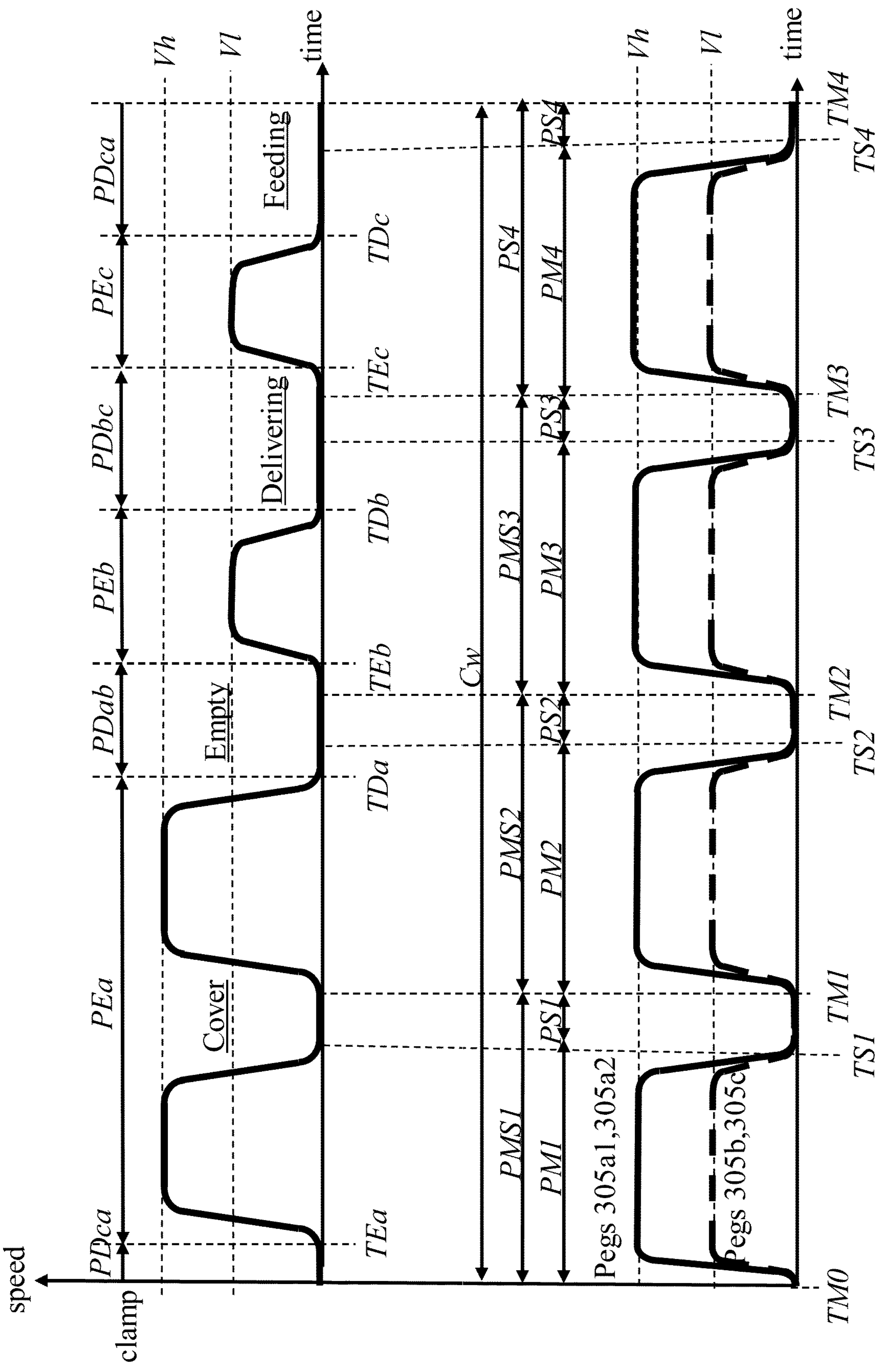

Moving to FIG. 4B, the driving system continually repeats moving periods PM (wherein the chain 225*a* and then its pegs 305*a*1,305*a*2 move at the speed Vh and the chains 225*b*-225*c* and then their pegs 305*b*,305*c* move at the speed Vl) and stop periods PS (wherein the chains 225*a*-225*c* and then their pegs 305*a*1,305*a*2,305*b*,305*c* are stopped) that are alternated to each other (again shown in solid line for the pegs 305*a*1,305*a*2 of the chain 225*a* and in dashed line for the pegs 305*b*,305*c* of the chains 225*b*,225*c*). Each pair of consecutive moving period PM and stop period PS defines a corresponding moving/stop period PMS. During every working cycle Cw of the perfect-binding machine 100, the moving/stop periods PMS are repeated a number of times equal to a number of the clamps 210*a*-210*d* being conveyed by the pegs 305*a*1,305*a*2,305*b*,305*c* in succession (four in the example at issue), so as to repeat the same behavior of the perfect-binding machine 100 over time (with the corresponding stop times, moving times, stop periods, moving periods and moving/stop periods that are differentiated in the figure with the addition of progressive numbers).

Particularly, a start condition is considered at the beginning of a generic moving period PM1 (time TM0) wherein a clamp is disengaged at the exchange area 230*ca* (the clamp 210*a* with the peg 305*a*2 inside its slit 310*a* in the situation shown in FIG. 3). The clamp 210*a* is engaged by the peg 305*a*2 at the time TEa (following a preceding stop period, not shown in the figure, by a non-null delay TEa-TM0), so that it accelerates up to reach its speed Vh. The clamp 210*a* then moves as the peg 305*a*2. Particularly, the clamp 210*a* moves at the speed Vh up to when the peg 305*a*2 reaches the (engagement) cover application station 205*d*, wherein the clamp 210*a* decelerates down to stop at the time TS1, remains stationary for the corresponding stop period PS1, and then accelerates at the time TM1 up to return to the speed Vh. The clamp moves at this speed Vh up to when it reaches the (empty) exchange area 230*ab* wherein the peg 305*a*2 disengages from it, so that the clamp 210*a* decelerates down to stop at the time TDa (preceding the following stop period PS2 by a non-null advance TS2-TDa). The clamp 210*a* is engaged by the peg 305*b* at the time TEb (following the preceding stop period PS2 by a non-null delay TEb-TM2), so that it accelerates up to reach its speed Vl. The clamp 210*a* then moves as the peg 305*b*. Particularly, the clamp 210*a* moves at the speed Vl up to when the peg 305*b* reaches the exchange area 230*bc* at the (disengagement) delivering station 205*e* wherein the peg 305*b* disengages from it, so that the clamp 210*a* decelerates down to stop at the time TDb (preceding the following stop period PS3 by a non-null advance TS3-TDb). The clamp 210*a* is engaged by the peg 305*c* at the time TEc (following the preceding stop period PS3 by a non-null delay TEc-TM3), so that it accelerates up to reach its speed Vl. The clamp 210*a* then moves as the peg 305*c*. Particularly, the clamp 210*a* moves at the speed Vl up to when the peg 305*c* reaches the exchange area 230*ca* at the (disengagement) feeding station 205*a* wherein the peg 305*c* disengages from it, so that the clamp 210*a* decelerates down to stop at the time TDc (preceding the following stop period PS4 by a non-null advance TS4-TDc). The clamp 210*a* remains stationary for the corresponding stop period PS4 thereby returning to the start condition.

Therefore, each clamp 210*a*-210*d* continually repeats engagement periods PE (wherein the clamp 210*a*-210*d* is engaged by a peg 305*a*1,305*a*2,305*b*,305*c*) and disengagement periods PD (wherein the clamp 210*a*-210*d* is disengaged from any peg 305*a*1,305*a*2,305*b*,305*c*) that are alternated to each other. Particularly, as shown in the figure, the clamp 210*a* is engaged by the peg 305*a*1 in the engagement period PEa, it is disengaged at the (empty) exchange area 230*ab* in the disengagement period PDab, it is engaged by the peg 305*b* in the engagement period PEb, it is disengaged at the exchange area 230*bc* with the (disengagement) delivering station 205*e* in the disengagement period PDbc, it is engaged by the peg 305*c* in the engagement period PEc, and it is disengaged at the exchange area 230*ca* with the (disengagement) feeding station 205*a* in the disengagement period PDca.

Therefore, each clamp 210*a*-210*d* remains stationary in the cover application station 205*d* for a processing period equal to the stop period PS. Each clamp 210*a*-210*d* instead remains stationary in the (empty) exchange area 230*ab*, in the feeding station 205*a* and in the delivering station 205*e* for corresponding processing periods equal to their disengagement periods PDab, PDbc and PDca, respectively, each equal to the stop period PS plus a time required by the peg 305*b*, the peg 305*c* and the peg 305*a*1,305*a*2, respectively, to travel across the passive section of the chain 225*b*, the chain 225*c* and the chain 225*a*, respectively (according to the speed Vl for the chains 225*b*,225*c* and to the speed Vh for the chain 225*a*). The engagement period PEa comprising the processing at the cover application station 205*d* is longer than the moving/stop period PMS, so as to ensure that whenever the driving system stops (with a clamp engaged by one of the pegs 305*a*1,305*a*2 of the chain 225*a* at the cover application station 205*d*) the other clamps at the exchange area 230*ab*, the delivering station 205*e* and the feeding station 205*a* are disengaged from the other peg 305*a*1,305*a*2 of the chain 225*a*, the peg 305*b* and the peg 305*c*.

This offers a number of additional advantages.

Particularly, it is possible to adjust the stop periods PS(dynamically), and then the processing period of the book blocks 215*a*-215*d* in the cover application station 205*d*. For example, the production of the books is typically performed in (processing) jobs, each involving the processing of a certain number of book blocks of a same type. Before every processing job, the operator enters corresponding configuration information by the touch-screen (for example, number of book blocks, their size and so on). At the same time, the operator may also enter an indication of the processing period of the book blocks 215*a*-215*d* in the cover application station 205*d* (such as its desired value). The control unit then sets the stop period PS to this processing period for all the book blocks of the processing job. Alternatively, the control unit may determine the stop period PS automatically according to characteristics of the book blocks of the processing job, such as their geometrical information (comprised in the configuration information of the processing job).

As a result, it is possible to optimize the processing period for the book blocks 215*a*-215*d* in the cover application station 205*d* for the different characteristics of the book blocks of the processing jobs individually; this significantly increases the quality of the corresponding books. This is advantageous with respect to the known disengagement machines. In fact, in the solution according to an embodiment of the present invention the modification of the processing period in the cover application station 205*d* is achieved without changing the speeds Vh,Vl and then without affecting the processing of the book blocks in the movement processing stations 205*b*,205*c*. All of the above not only significantly facilitates a control of the movement processing stations 205*b*,205*c* but it allows designing them according to a specific optimal processing speed. Therefore, no compromise is required between optimal design (ensuring high quality) and yield of the perfect-binding machine 100. In the known disengagement machines, instead, the only possibility for changing the processing period in any processing station (wherein the clamp remains stationary thanks to its disengagement from the driving system always moving at the same constant speed) is to change the speed accordingly; this may adversely affect the quality of the operations performed in the movement processing stations, and it adversely affects the yield of the perfect-binding machine when the speed is reduced to increase the processing period. Moreover, in the solution according to an embodiment of the present invention, when the stop period PS is shortened the working cycle Cw is shortened as well, with a corresponding increase of the yield of the perfect-binding machine 100. This is advantageous with respect to the known fixed machines, wherein the stop period is always equal to the longest one of all the stationary processing stations.

In addition or in alternative, it is possible to adjust the moving periods PM (dynamically), and accordingly a stop position of the pegs 305*a*1,3052 of the chain 225*a* and then of the clamps 210*a*-210*d* in the cover application station 205*d*.

For example, the segments of the chain 225*a* defined by the pegs 305*a*1,305*a*2 may have (slightly) different lengths, such as because of errors caused by tolerances, wearing and so on; as a result, the pegs 305*a*1,3052 and then the clamps 210*a*-210*d* conveyed by them may stop at different stop positions in the cover application station 205*d*. In a test mode of the perfect-binding machine 100 (selected by the operator via the touch-screen), or automatically during its production mode, the control unit measures (via the sensor 315) the displacement between the book block 215*a*-215*d* hold by each clamp 210*a*-210*d* and the corresponding cover in the cover application station 205*d* (when the clamp 210*a*-210*d* is stationary therein). The control unit determines the displacement for each segment of the chain 225*a* according to the displacement of the clamp 210*a*-210*d* conveyed by the peg 305*a*1,305*a*2 at the end of the segment (such as equal to an average of multiple values thereof). The control unit calculates a time adjustment for the moving period PM of each segment of the chain 225*a* for compensating the corresponding displacement. The control unit then controls the driving system to move each segment of the chain 225*a*, when its peg 305*a*1,305*a*2 is reaching the cover application station 205*d*, for the moving period PM adjusted according to the corresponding time adjustment so as to ensure that the peg 305*a*1,305*a*2, and then the clamp 210-210*d* conveyed by it, always stops at the correct stop position therein. As a result, it is possible to compensate any inaccuracies of the chain 225*a*, thereby ensuring that the book blocks 215*a*-215*d* are always processed in the cover application station 205*d* in the correct stop position; this significantly increases the quality of the corresponding books.

As a further example, before every processing job the operator enters an indication of the stop position for the clamps 210*a*-210*d* in the cover application station 205*d* (such as in terms of relative position between each pair of book block 215*a*-215*d* and cover when the corresponding clamp 210*a*-210*d* is stationary therein, like at the middle of the cover, aligned with or at certain distance from a longitudinal end of the cover, and so on). The control unit calculates the value of the moving period PM required to stop the clamps 210*a*-210*d* at this stop position in the cover application station 205*d*. The control unit then controls the driving system to move for this moving period PM. As a result, it is possible to adapt the processing of the book blocks 215*a*-215*d* in the cover application station 205*d* according to different requirements of the processing jobs.

In both cases, the modification of the moving periods PM(either for correcting errors of the stop position due to inaccuracies of the chain 225*a* or for changing the stop position to comply with the requirements of the processing jobs) has no effect on the stop position of the clamps 210*a*-210*d* in the other stationary processing stations 205*a*, 205*e*; in fact, assuming that the other pegs 305*a*2,305*b*,305*c* are in the passive sections of the corresponding chains 225*a*,225*b*,225*c* in positions spaced apart from their active sections (behind and ahead) by more than a maximum allowable change of the stop position resulting from the adjustment of the moving periods PM (for example, 0.1-1.0 mm and 1-20 mm for correcting and changing, respectively, the stop position), the clamps at the stationary processing stations 205*a*,205*e* remain disengaged from the pegs 305*b*, 305*c*.

This is impossible in the known disengagement machines, since the clamps are disengaged from the driving system at all the stationary processing stations. Moreover, this is advantageous with respect to the known fixed machines, wherein any modification of the moving periods to correct the stop position of the clamps in a specific stationary processing station would adversely affect the stop position of the clamps in the other stationary processing stations.

In addition or in alternative, it is possible to adjust the stop position of each peg 305*a*1,305*a*2, and then of the clamp 210*a*-210*d* conveyed by it, in the cover application station 205*d* individually.

For example, in the production mode of the perfect-binding machine 100, as soon as each peg 305*a*1,305*a*2, and then the clamp 210*a*-210*d* conveyed by it, has stopped in the cover application station 205*d*, the control unit measures (via the sensor 315) the displacement between the book block 215*a*-215*d* hold by the clamp 210*a*-210*d* and the cover to be applied thereto (before processing the book block 215*a*-215*d*). If the book block 215*a*-215*d* is not aligned with the cover (i.e., the displacement exceeds an acceptable threshold in absolute value), the control unit controls the driving system to move for adjusting the stop position of the peg 305*a*1,305*a*2, and then of the clamp 210*a*-210*d* conveyed by it, according to the displacement (so as to remove it, or at least reduce it below the acceptable threshold); particularly, when the book block 215*a*-215*d* is ahead the cover the driving system moves backwards (by a distance opposite the displacement), whereas when the book block 215*a*-215*d* is behind the cover the driving system moves forwards (by a distance equal to the displacement). The book block 215*a*-215*d* is then processed in the cover application station 205*d* in this (adjusted) stop position.

As a result, it is possible to compensate any misalignment between the book blocks 215*a*-215*d* and the covers (for example, due to mechanical inaccuracies, changes in the covers resulting from their creasing and so on), thereby ensuring that the book blocks 215*a*-215*d* are always processed in the cover application station 205*d* correctly aligned with the covers (without the need of moving the cover); this significantly increases the quality of the corresponding books. In this case well, the adjustment of the stop position in the cover application station 205*d* has no effect on the stop position of the clamps in the other stationary processing stations 205*a*,205*e*; in fact, as above assuming that the other pegs 305*a*1,305*b*,305*c* are in the passive sections of the corresponding chains 225*a*,225*b*,225*c* in positions spaced apart from their active sections by more than a maximum allowable adjustment of the stop position (for example, 0.1-1.0 mm), the clamps at the stationary processing stations 205*a*,205*e* remain disengaged from the pegs 305*a*1,305*b*,305*c*.

As above, this is impossible in the known disengagement machines, since the clamps are disengaged from the driving system at all the stationary processing stations. Moreover, this is again advantageous with respect to the known fixed machines, wherein any modification of the stop position of the clamps in a specific stationary processing station would adversely affect the stop position of the clamps in the other stationary processing stations.

More generally, the above-described implementation provides a structure that may be controlled in a simple way, thanks to the single driving system for all the clamps 210*a*-210*d*; this allows limiting the cost of the perfect-binding machine 100, with a beneficial effect on a production cost of the books as well. The perfect-binding machine 100 has a compact design, thanks to the passive sections of the chains 225*a*-225*c*. The perfect-binding machine 100 has a limited downtime, since the driving system is stopped only for the shortest processing period (in the cover application station 205*d*). The perfect-binding machine 100 may adjust the processing of the book blocks 215*a*-215*d* in the cover application station 205*d* at will, with a corresponding increase of the production quality.

Figure 4C:
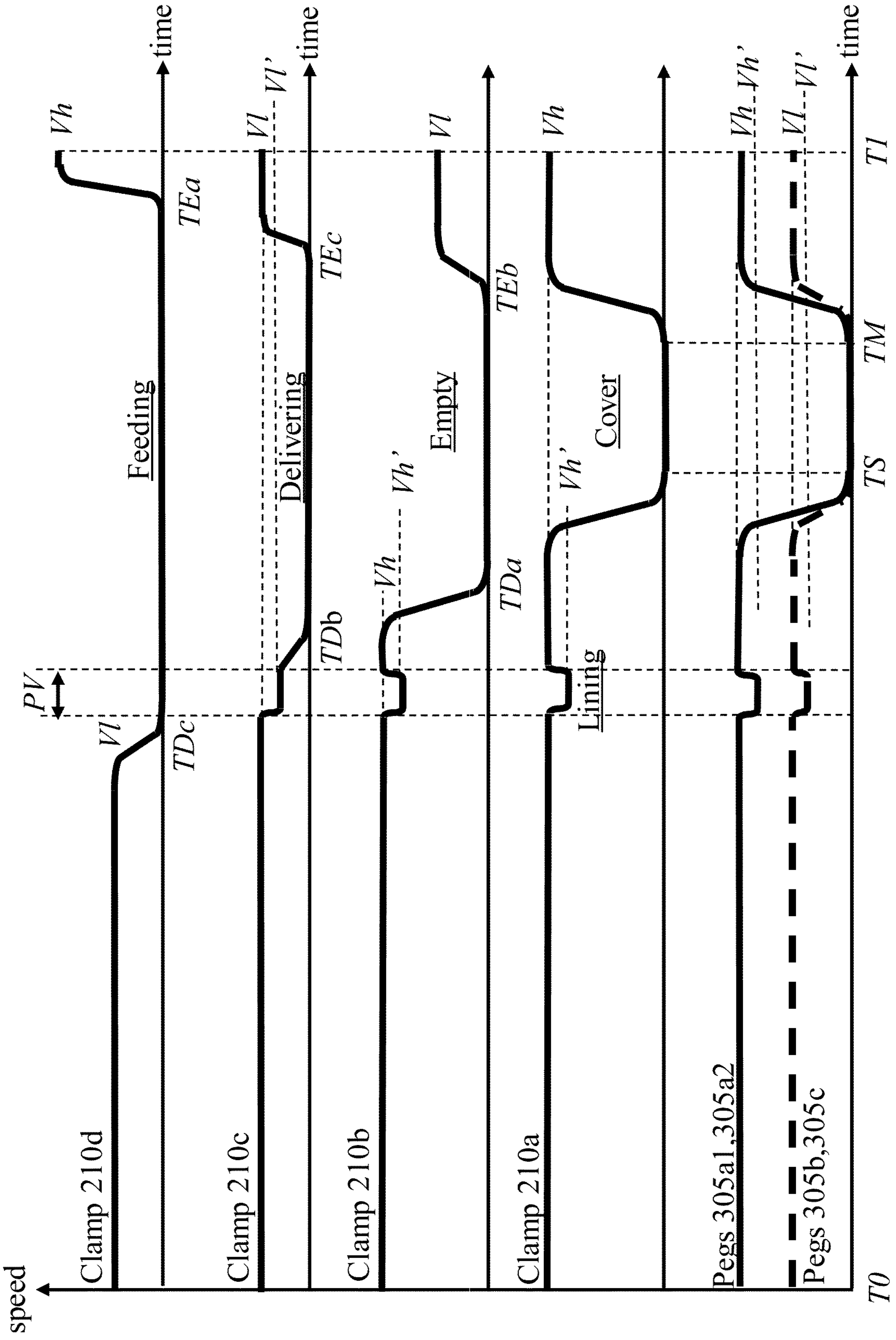

Moving to FIG. 4C, the book blocks 215*a*-215*d* are processed in the movement processing stations 205*b*,205*c* while they are crossing them at a processing speed equal to the speed Vh. In a specific implementation, the speeds Vh,Vl vary over time (always complying with their relationship, i.e., Vh=2·Vl in this case). For example, in every moving period PM the speeds Vh,Vl vary in a (variation) period PV during which a peg 305*a*1,305*a*2 of the chain 225*a* is moving along its active section crossing a specific movement processing station (such as the lining station 205*c*); particularly, the speed Vh vary to a (variation) speed Vh', equal to a desired processing speed (different from the speed Vh) of the book blocks crossing the lining station 205*c* for their processing (with the speed Vl that vary accordingly to a (variation) speed Vl', again with Vl'=Vh'/2 in this case); for example, as shown in the figure the variation speeds Vh', Vl' are lower than the speeds Vh,Vl (with similar considerations that apply when the variation speeds Vh', Vl' are higher than the speeds Vh,Vl). The variation speeds Vh',Vl' and the variation period PV may be pre-defined statically (according to the characteristics of the perfect-binding machine 100), selected dynamically (by the operator with the touch-screen, globally or individually per each processing job) or determined automatically (according to the geometrical information of the book blocks of the processing job). Each clamp 210*a*-210*d* being conveyed by a peg 305*a*1,305*a*2 of the chain 225*a* across the lining station 205*c* (the clamp 210*a* conveyed by the peg 305*a*2 in the example at issue) moves with the same motion law, so that its book block 215*a* crosses the lining station 205*c* with the desired variation speed Vh'.

As a result, it is possible to optimize the processing speed of the book blocks 215*a*-215*d* (in the movement processing stations) according to the different characteristics of the movement processing stations (globally) and/or of the book blocks of the processing jobs (individually); this further increases the quality of the corresponding books. The variation of the speeds Vh,Vl has no impact on the processing of the book blocks 215*a*-215*d* in the other processing stations 205*a*-205*b*,205*d*-205*e*. In fact, in the variation period PV the other clamps are disengaged (such as the clamp 210*d* being stationary in the feeding station 205*a* in the example at issue) and/or they are moving away from all the processing stations 205*a*-205*e* (such as the clamps 201*b* moving at the variation speed Vh' between the cover application station 205*d* and the exchange area 230*ab* and the clamp 210*c* moving at the variation speed Vl' between the exchange area 230*ab* and the delivery station 205*e*).

Figure 4D:
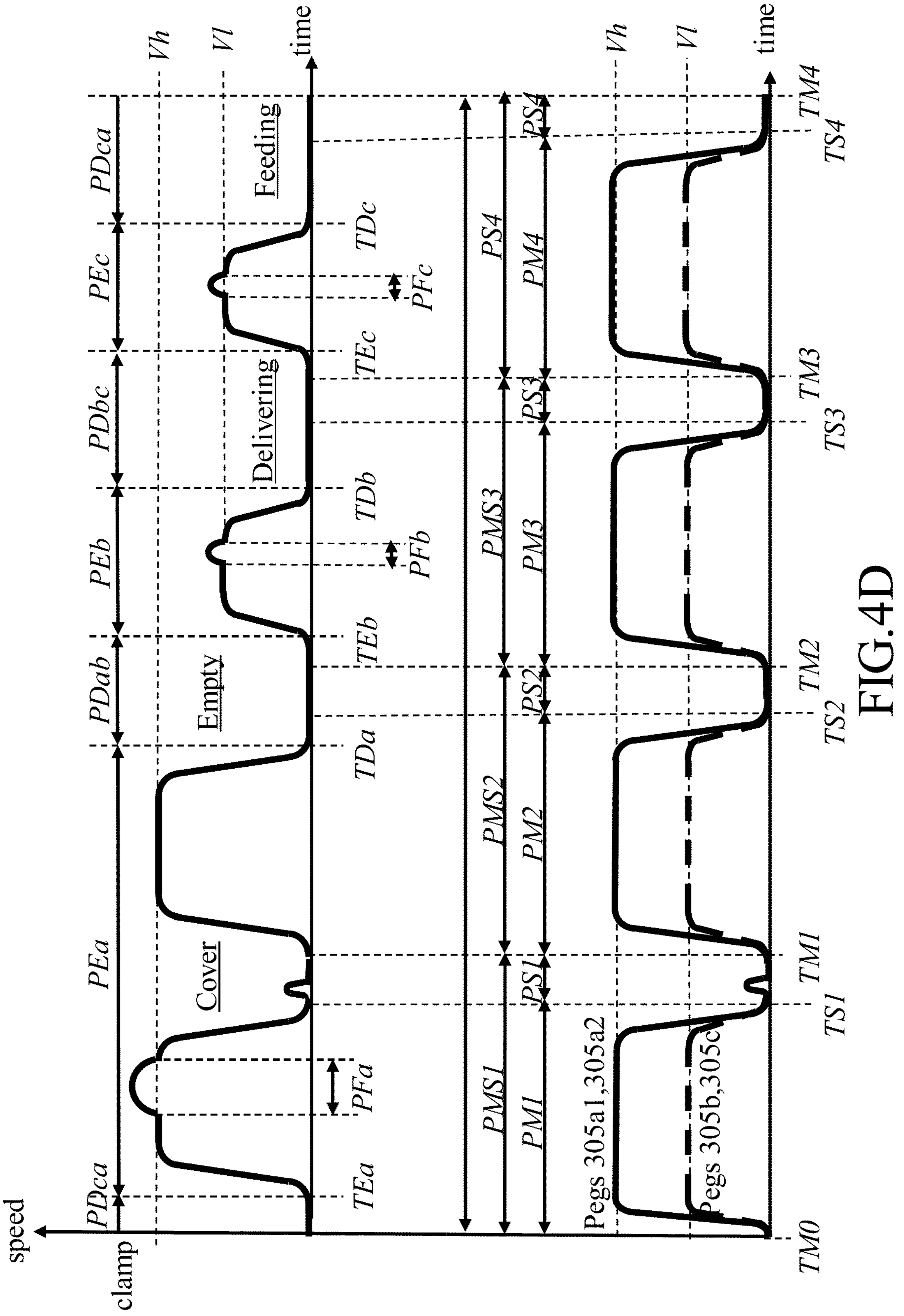

Moving to FIG. 4D, the same motion law as above of the driving system with constant speeds Vh, Vl is shown, with the addition of the movement of a pegs 305*a*1,305*a*2 (by accelerating and then decelerating) for adjusting the stop position in the cover application station 205*d* at the beginning of the first stop period PS1 (forwards in the example at issue, with similar considerations that apply when the stop position is adjusted backwards and/or in other stop periods PS).

In a specific implementation, the active sections of the chains 225*a*-225*c* may differ from the transport path 220. Particularly, in plant view the chains 225*a*-225*c* have curved portions of their active sections, away from the processing stations 205*a*-205*e*, wherein they extend inside corresponding curved portions of the transport path 220, each one between a pair of common points wherein the chains 225*a*-225*c* and the transport path 220 are coincident. Since each curved portion of the chains 225*a*-225*c* is shorter than the corresponding curved portion of the transport path 220 between the common points, in these zones the clamps 210*a*-210*d* necessarily move faster than the pegs 305*a*1, 305*a*2,305*b*,305*c* carrying them do (by sliding and rotating with respect thereto). For example, this happens in a (fast) period PFa for the chain 225*a* between the movement processing station 205*c* and the cover application station 205*d* (half-circle to the right in FIG. 3), in a (fast) period PFb for the chain 225*b* before reaching the delivering station 205*e* (arc above to the left in FIG. 3), and in a (fast) period PFc for the chain 225*c* before reaching the feeding station 205*a* (arc below to the left in FIG. 3).

The above-described feature allows reducing the length of the curved portions of the chains 225*a*-225*c*, for the same length of the corresponding curved portions of the transport path 220 (with a sufficiently high curvature radius providing a smoother movement of the clamps 225*a*-225*d*). The resulting shortening of the chains 225*a*-225*c* has a beneficial effect on the size and on the yield of the perfect-binding machine 100.

Moreover (not shown in the figure), the chain 225*a* may have one or more (oblique) portions of its active section, each running obliquely to a corresponding straight portion of the transport path 220 at one or more movement processing stations 205*b*-205*c* (for example, forming an angle $\alpha$=5-70°). Each peg 305*a*1-305*a*2 of the chain 225*a* in its oblique portion moves with a speed (tangential thereto), which has a component perpendicular to the slit 310*a*-310*d* of the clamp 210*a*-210*d* being conveyed by it (which moves the clamp 210*a*-210*d* integral with the peg 305*a*1-305*a*2) and a component longitudinal along the slit 310*a*-310*d* (which causes the peg 305*a*1-305*a*2 to slide along it). The clamp 210*a*-210*d* then moves along the guide 220 at a speed (Vh·cos $\alpha$) lower than the speed Vh of the peg 305*a*1-305*a*2. The above-described feature allows reducing the speed of the clamps 305*a*1-305*a*2 across any movement processing stations 205*b*-205*c* (for example, to improve a quality of the corresponding processing). This result is achieved without changing the speed Vh of the chain 225*a*, and then without adversely affecting the yield of the perfect-binding machine 100.

Modifications

Naturally, in order to satisfy local and specific requirements, a person skilled in the art may apply many logical and/or physical modifications and alterations to the present invention. More specifically, although this invention has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof, conversely, well-known features may have been omitted or simplified in order not to obscure the description with unnecessary particulars. Moreover, it is expressly intended that specific elements and/or method steps described in connection with any embodiment of the present invention may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a bookbinding machine. However, the bookbinding machine may be of any type (for example, a perfect-binding machine, a case-in machine and so on).

In an embodiment, the bookbinding machine comprises a plurality of processing stations for processing book blocks. However, the processing stations may be in any number, at any position and of any type (for example, only stationary ones, stationary ones and movement ones, and so on) and they may be used for processing any book blocks (for example, formed by signatures, flat sheets, with or without inserts, sewn, glued, stapled or collected in any other way, and so on).

In an embodiment, the bookbinding machine comprises a plurality of transport elements for transporting the book blocks individually. However, the transport elements may be in any number and of any type (for example, clamps, belts, holders, grippers and so on).

In an embodiment, the transport elements are adapted to transporting the book blocks across the processing stations in a transport direction along a transport path being closed. However, the book blocks may be transported along any transport path (for example, oval, circular, irregular and so on) in any direction (for example, counter-clockwise, clockwise and so on).

In an embodiment, the bookbinding machine comprises a plurality of endless conveyors. However, the endless conveyors may be in any number and of any type (for example, chains, belts and so on).

In an embodiment, the endless conveyors are arranged in a wrap-around succession with corresponding exchange areas at the transport path between pairs of adjacent ones of the endless conveyors. However, the endless conveyors may be arranged in any way (for example, with sections corresponding to the transport path coincident with it, slightly spaced apart from it, any combination thereof and so on).

In an embodiment, each of the endless conveyors carries one or more conveying elements (distributed uniformly along the endless conveyor when more than one). However, each endless conveyor may have any number of conveying elements of any type (for example, pegs, studs, hooks, carriers and so on); in any case, the same function may also be obtained with transport elements that are capable of engaging with and disengaging from each (uniform) endless conveyor in response to a command (with the corresponding portions of the endless conveyor engaged by the transport elements that implement its conveying elements).

In an embodiment, the bookbinding machine comprises a driving system for driving the endless conveyors. However, the driving system may be of any type (for example, mechanical, magnetic, with or without a guide for the transport elements, and so on).

In an embodiment, the driving system is for causing each of the conveying elements of each of the endless conveyors in succession to engage one of the transport elements at a start one of the exchange areas of the endless conveyor. However, the conveying element may engage the transport element in any way (for example, with the conveying element entering a slit of the transport element, the conveying element hooking the transport element, the transport element hooking the endless conveyor and so on).

In an embodiment, the driving system is further for causing the conveying element to convey the transport element along the transport path for an active section of the endless conveyor from the start exchange area to another end one of the exchange areas thereof in the transport direction. However, the conveying element may convey the transport element in any way (for example, at the same speed when integral with the conveying element, at a different speed when movable with respect to the conveying element, with the conveying element pushing or pulling the transport element, and so on).

In an embodiment, the driving system is for further causing the conveying element to disengage the transport element at the end exchange area of the endless conveyor. However, the conveying element may disengage the transport element in any way (for example, with the conveying element still in contact with the transport element but without applying any force, separate from the transport element and so on).

In an embodiment, the driving system is further for causing the conveying element to return free of the transport elements away from the transport path for a passive section of the corresponding endless conveyor from the end exchange area to the start exchange area thereof in the transport direction. However, the passive section may be of any type (for example, at any distance from the transport path, going from the end exchange area to the start exchange area directly or with any diversion, and so on).

In an embodiment, the driving system drives the endless conveyors at corresponding speeds each proportional to a ratio between a length of the corresponding endless conveyor and a number of the corresponding conveying elements according to a common moving frequency. However, the driving system may drive the endless conveyors in any way (for example, by a common motor, with or without a transmission system, and so on) at the corresponding speeds based on any moving frequency (for example, fixed, variable and so on).

Further embodiments provide additional advantageous features, which may however be omitted at all in a basic implementation.

Particularly, in an embodiment the driving system is configured for driving the endless conveyors at the corresponding speeds being at least in part different. However, the speeds may differ in any way in compliance with the corresponding relationship (for example, different for all the endless conveyors, the same for one or more groups of endless conveyors and so on); in any case, a basic implementation with a common speed for all the endless conveyors falls within the scope of the present invention (for example, when the proposed solution is used only to stop the conveying elements within the slits of the transport elements).

In an embodiment, the driving system comprises a common motor. However, the common motor may be of any type (for example, a servomotor, a step motor and so on).

In an embodiment, the driving system comprises a transmission mechanism for driving the endless conveyors by the motor at the corresponding speeds. However, the transmission system may be of any type (for example, based on toothed belts, gears, chains and so on); in any case, an implementation with multiple motors for the different speeds falls within the scope of the present invention (even if less efficient).

In an embodiment, the processing stations comprise at least one engagement processing station and one or more disengagement processing stations for processing the book blocks while stationary therein. However, the engagement processing stations may be in any number and of any type (for example, a cover application station, an end-papering station and so on); likewise, the disengagement processing stations may be in any number and of any type (for example, an automatic feeding station, a manual feeding station, a delivering station, a pressing station and so on).

In an embodiment, the engagement processing station is arranged along the active section of one of the endless conveyors. However, the engagement processing station may be arranged at any position along the active section of any one of the endless conveyers.

In an embodiment, the disengagement processing stations are arranged at corresponding ones of the exchange areas. However, the disengagement processing stations may be arranged at any exchange areas (for example, all of them, with one or more exchange areas left empty, and so on).

In an embodiment, the bookbinding machine comprises a control unit. However, the control unit may be of any type (for example, a computer, a micro-controller and the like, a mechanical system, and so on).

In an embodiment, the control unit is configured for stopping the driving system repeatedly for corresponding stop periods alternated with moving periods. However, the driving system may be stopped in any way (for example, with any deceleration) for any stop periods (for example, of any value, fixed, variable globally or individually for each processing job, equal to the processing period of a single engagement processing station or to the longest processing period of multiple engagement processing stations, and so on) alternated with any moving periods (for example, of any value, fixed, variable globally or individually for each processing job, and so on).

In an embodiment, in each of the stop periods one of the transport elements is engaged at the engagement processing station and corresponding other ones of the transport elements are disengaged at the exchange areas for corresponding disengagement periods. However, this behavior may be obtained in any way (for example, with the transport elements that are disengaged at the exchange areas before to the stop periods or at the beginning thereof, with the transport elements that are engaged at the exchange areas after the stop periods or at the end thereof, any combination thereof and so on).

In an embodiment, each disengagement period starts before the corresponding stop period by a non-null advance. However, the advance may be of any value (down to zero, for example, when the moving period may not be decreased and/or the stop position may not be moved backwards).

In an embodiment, each disengagement period ends after the corresponding stop period by a non-null delay. However, the delay may be of any value (down to zero, for example, when the moving period may not be increased and/or the stop position may not be moved forwards).

In an embodiment, the driving system is configured for driving the endless conveyor preceding the exchange area of at least one of the disengagement processing stations in the transport direction at the corresponding speed being lower than one or more of the other speeds. However, the driving system may drive any number of endless conveyors preceding the disengagement processing stations at any position along the transport path (for example, only the ones arranged at curved portions of the transport path, all of them and so on) at any lower speed.

In an embodiment, the transport elements comprise corresponding slits for receiving one of the conveying elements in succession. However, the slits may be of any type (for example, with any length, extending radially, tangentially, horizontally, vertically and so on).

In an embodiment, each of the transport elements is engaged when one of the conveying elements moves transversally inside the corresponding slit thereby acting on the transport element. However, the conveying element may engage the transport element by moving transversally to its slit in any way (for example, perpendicularly, obliquely and so on).

In an embodiment, the transport element is disengaged otherwise. However, the conveying element may disengage from the transport element in any way (for example, moving along the slit and then leaving it, leaving it immediately and so on).

In an embodiment, in each of the stop periods the transport elements being disengaged at the exchange areas each has one of the conveying elements stopped within the slit thereof. However, the conveying element may stop at any position along the slit; in any case, a basic implementation with at least part of the conveying elements being stopped outside the slits of the transport elements (for example, at straight portions of the transport path) falls within the scope of the present invention (for example, when the proposed solution is used only to drive the endless conveyors at different speeds).

In an embodiment, the engagement processing station is a cover application station for applying corresponding covers to the book blocks. However, the covers may be of any type (for example, soft, rigid and so on).

In an embodiment, the end exchange area of the endless conveyor corresponding to the cover application station is free of the processing stations. However, the possibility is not excluded of providing any processing station at this end exchange area (for example, a delivering/pressing station, a pressing station and so on).

In an embodiment, the control unit is configured for adjusting the stop periods. However, the stop periods may be adjusted in any way (for example, manually, automatically, such as according to one or more characteristics of the processed book blocks being measured via corresponding sensors, globally or individually for the processing jobs, and so on).

In an embodiment, the bookbinding machine comprises an input unit. However, the input unit may be implemented with means of any type (for example, a touch-screen, a keypad, a reader of any codes, such as barcodes, QRcodes and the like, an OCR device, a network interface card and so on).

In an embodiment, the input unit is for entering an indication of a processing period in the engagement processing station. However, the processing period may be indicated in any way (for example, by its value, a delta with respect to a default value, for a processing job or in general, and so on).

In an embodiment, the indication of the processing period is for one or more of the book blocks of a processing job. However, the processing job may comprise any number of book blocks and its processing period may be provided in any way (for example, entered manually, read from the book blocks, received over a network and so on).

In an embodiment, the control unit is configured for setting the stop periods for the book blocks of the processing job to the processing period. However, the stop periods may be set in any way (for example, maintaining the new value up to a next change thereof, returning to the default value automatically at the end of the processing job and so on).

In an embodiment, the control unit is configured for adjusting the moving periods. However, the moving periods may be adjusted in any way (for example, manually, automatically, such as according to one or more characteristics of the processed book blocks being measured via corresponding sensors, globally or individually for the processing jobs, and so on).

In an embodiment, the bookbinding machine comprises the input unit for entering an indication of a stop position in the engagement processing station. However, the stop position may be indicated in any way (for example, by its value, a delta with respect to a default value, for a processing job or in general, and so on).

In an embodiment, the indication of the stop position is of one or more of the book blocks of a further processing job. However, the processing job may be of any type (see above) and its stop position may be provided in any way (for example, either the same or different with respect to the processing period).

In an embodiment, the control unit is configured for adjusting the moving periods for the book blocks of the further processing job according to the stop position. However, the moving periods may be adjusted in any way (for example, maintaining the new value up to a next change thereof, returning to the default value automatically at the end of the processing job and so on).

In an embodiment, the booking machine comprises means for measuring corresponding displacements of the book blocks at the engagement processing station in the stop periods. However, these means may be implemented by any sensor (for example, optical, mechanical and so on) for measuring any displacement (for example, between the book block and a cover, an end-paper, a fastening lining, quantitatively or qualitatively, and so on). The sensor may be arranged at any position (for example, in the engagement processing station for measuring the displacement directly before, during or after the processing of the book blocks, in the delivering station for measuring the displacement indirectly on the processed book blocks and so on).

In an embodiment, the control unit is configured for calculating corresponding time adjustments for the conveying elements of the endless conveyor corresponding to the engagement processing station each according to the displacements of the corresponding book blocks. However, the time adjustments may be calculated in any way (for example, equal to any central statistical parameter like average, median, mode and the like of any number of multiple displacements, equal to a single displacement and so on).

In an embodiment, the control unit is configured for adjusting the moving periods for each of the conveying elements reaching the engagement processing station according to the corresponding time adjustment. However, the moving periods may be adjusted in any way according to the time adjustments (for example, totally by the opposite of the time adjustment, incrementally by a percentage thereof and so on). This operation may be performed at any time (for example, in test mode at the installation and/or at any maintenance of the bookbinding machine, in production mode periodically or after any number of processing jobs, and so on).

In an embodiment, the bookbinding machine comprises means at the engagement processing station for measuring (in each of the stop periods) a displacement of the corresponding book block at a stop position in the engagement processing station before the processing thereof. However, these means may be implemented by a sensor of any type for measuring any displacement (for example, the same sensor as above, a further sensor of the same or different type, and so on). The displacement may be measured at any time before the processing of the book block (for example, at the stop time, with a certain delay from it, as soon as a further sensor detects that the book block is stationary and so on).

In an embodiment, the control unit is configured for controlling the driving system (in each of the stop periods) to adjust the stop position of the book block in the engagement processing station according to the displacement of the book block for the processing thereof. However, the stop position may be adjusted in any way (for example, in an open loop technique by correcting the position entirely according to the displacement, in a closed loop technique by modifying the position continually until it is correct and so on). Particularly, it is possible to measure the displacement, to calculate a movement required to compensate the displacement and then to move the conveying element accordingly. Alternatively, it is possible to determine a direction of the displacement (such as book block too ahead or too behind), moving the conveying element by a predetermined distance in the opposite direction (backwards when too ahead or forwards when to behind) until the position is correct.

In an embodiment, the bookbinding machine comprises means at the engagement processing station for measuring the displacement between the book block of each of the transport elements at the engagement processing station and the corresponding cover. However, the displacement may be measured in any way (for example, by detecting the position of both the book block and the cover, by detecting the position of the book block and comparing it with a known position of the cover and so on).

In an embodiment, the control unit is configured for controlling the driving system to drive the endless conveyors at the corresponding speeds varying over time. However, the speeds may be varied in any way (for example, with periods at lower and/or higher constant speed, with any acceleration/deceleration or more generally with any other motion law, globally or individually for each processing job, and so on). In any case, the possibility is not excluded of always having constant speeds (for example, fixed, customizable, self-adapting and so on).

In an embodiment, the bookbinding machine comprises a guide for guiding the transport elements along the transport path. However, the guide may be of any type (for example, a rail, a track and so on).

In an embodiment, the conveying elements comprise corresponding pegs integral with the endless conveyors. However, the pegs may be of any type (for example, with any cross-section, length and so on) and they may be integral with the conveyor in any way (for example, extending downwards, upwards, laterally and so on).

In an embodiment, the transport path is curved between at least one pair of common points wherein the transport path and a corresponding one of the endless conveyors coincide. However, the curved portions may be in any number and of any type (for example, with constant or varying curvature radius, with or without straight portions between the common points, and so on).

In an embodiment, between the pair of common points the endless conveyor comprises an internal portion of the active section thereof extending inside a corresponding external portion of the transport path (wherein each of the pegs of the endless conveyor slides along the slit of the transport element engaged by the peg thereby causing the transport element to move faster than the peg). However, the internal portion and the external portion may be at any distance (for example, increasing/decreasing uniformly, with an irregular trend and so on) to achieve any difference of speed (for example, constant or varying along the curved portion of the transport path, and so on).

In an embodiment, the processing stations comprise one or more movement processing stations for processing the book blocks while moving thereacross. However, the movement processing stations may be in any number (down to none) and of any type (for example, lining station, milling station, gluing station and so on).

In an embodiment, the movement processing stations are arranged along at least one straight portion of the transport path for the active section of at least one of the endless conveyors. However, the movement processing stations may be arranged in any way (for example, a single one or two or more consecutive ones per straight portion, all together in the same straight portion or distributed across two or more of them, and so on); in any case, the possibility is not excluded of having some movement processing stations in portions of the transport path that are curved.

In an embodiment, at least one of the endless conveyors comprises an oblique portion at a corresponding one of the movement processing stations extending obliquely to the corresponding straight portion of the transport path (wherein each of the pegs moves obliquely to the slit of the transport element being engaged by the peg thereby causing the transport element to move slower than the peg). However, the oblique portion may extend at any angle (for example, moving away and then moving close uniformly at the same or different rate, with an irregular trend, such as moving away, in parallel and then close, and so on) to achieve any difference of speed (for example, constant or varying along the corresponding straight portion of the transport path, and so on).

In an embodiment, the processing stations are adapted to be driven individually. However, the possibility is not excluded of one or more groups of (two or more) processing stations that are driven together (up to all).

In an embodiment, the bookbinding machine is a perfect-binding machine. However, the perfect-biding machine may be of any type (for example, of automatic/manual type, for applying covers with or without end-papers/linings and so on).

A further embodiment provides a bookbinding plant comprising one or more instances of the above-described bookbinding machine. However, the bookbinding plant may be of any type (for example, with any number of these bookbinding machines and any number and type of further bookbinding machines, such as gathering machines, sewing machines, case-in machines, trimming machines and so on).

Generally, similar considerations apply if the bookbinding machine and the bookbinding plant each has a different structure or comprises equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

A further embodiment provides a method for operating a bookbinding machine. In an embodiment, the method comprises processing book blocks in a plurality of processing stations. In an embodiment, the method comprises transporting the book blocks individually across the processing stations in a transport direction along a transport path being closed by a plurality of transport elements. In an embodiment, the method comprises driving a plurality of endless conveyors arranged in a wrap-around succession with corresponding exchange areas at the transport path between pairs of adjacent ones of the endless conveyors (each of the endless conveyors carrying one or more conveying elements distributed uniformly along the endless conveyor when more than one) by a driving system to cause each of the conveying elements of each of the endless conveyors in succession to engage one of the transport elements at a start one of the exchange areas of the endless conveyor, to convey the transport element along the transport path for an active section of the endless conveyor from the start exchange area to another end one of the exchange areas thereof in the transport direction, to disengage the transport element at the end exchange area of the endless conveyor, and to return free of the transport elements away from the transport path for a passive section of the endless conveyor from the end exchange area to the start exchange area thereof in the transport direction. In an embodiment, the method comprises driving the endless conveyors by the driving system at corresponding speeds each proportional to a ratio between a length of the endless conveyor and a number of the corresponding conveying elements according to a common speed factor. However, the same considerations pointed out above with respect to the features of the bookbinding machine apply to the corresponding steps of the method as well.

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

A further embodiment provides a computer program configured for causing a control unit of a bookbinding machine to perform the above-described method when the computer program is executed on the control unit. A further embodiment provides a computer program product comprising a computer readable storage medium embodying a computer program, the computer program being loadable into a working memory of a control unit of a bookbinding machine thereby configuring the control unit to perform the same method. However, the program may take any form suitable to be used by any control unit (see above), such as in the form of external or resident software, firmware, or microcode (either in object code or in source code, for example, to be compiled or interpreted). Moreover, it is possible to provide the program on any computer readable storage medium of tangible type, different from transitory signals per se (which may retain and store instructions for use by the control unit, such as of electronic, magnetic, optical, electromagnetic, infrared, or semiconductor type, like fixed disks, memory keys and so on). In any case, the solution according to an embodiment of the present invention lends itself to be implemented even with a hardware structure (for example, by electronic circuits integrated in one or more chips of semiconductor material), or with a combination of software and hardware suitably programmed or otherwise configured.

The invention claimed is:

1. A bookbinding machine comprising:

a plurality of processing stations for processing book blocks, a plurality of transport elements for transporting the book blocks individually across the processing stations in a transport direction along a transport path having a closed shape, a plurality of endless conveyors arranged in a wrap-around succession, wherein corresponding exchange areas are defined at the transport path between pairs of adjacent ones of the endless conveyors, each of the endless conveyors carrying a number equal to one or more of conveying elements, the conveying elements being distributed uniformly along the corresponding endless conveyor when the conveying elements are more than one, and a driving system for driving the endless conveyors to cause each of the conveying elements of each of the endless conveyors in succession to engage one of the transport elements at a start exchange area of the exchange areas of the endless conveyor, to convey the transport element along the transport path for an active section of the endless conveyor from the start exchange area to an end exchange area of the exchange areas following the start exchange area along the transport direction, to disengage the transport element at the end exchange area of the endless conveyor, and to return free of the transport elements away from the transport path for a passive section of the endless conveyor from the end exchange area to the start exchange area thereof in the transport direction, wherein the driving system drives the endless conveyors at corresponding speeds each proportional to a ratio between a length of the corresponding endless conveyor and the number of the corresponding conveying elements according to a common moving frequency.

2. The bookbinding machine according to claim 1, wherein the speeds of the endless conveyors are at least in part different.

3. The bookbinding machine according to claim 2, wherein the driving system comprises a common motor and a transmission mechanism for driving the endless conveyors by the motor at the corresponding speeds.

4. The bookbinding machine according to claim 1, wherein the processing stations comprise at least one engagement processing station and one or more disengagement processing stations for processing the book blocks while stationary therein, the engagement processing station being arranged along the active section of one of the endless conveyors and the disengagement processing stations being arranged at corresponding ones of the exchange areas, and wherein the bookbinding machine comprises a control unit configured for stopping the driving system repeatedly for corresponding stop periods alternated with moving periods, in each of the stop periods one of the transport elements being engaged at the engagement processing station and corresponding other ones of the transport elements being disengaged at the exchange areas for corresponding disengagement periods.

5. The bookbinding machine according to claim 4, wherein each of the disengagement periods starts before the corresponding stop period by a non-null advance, and wherein each of the disengagement periods ends after the corresponding stop period by a non-null delay.

6. The bookbinding machine according to claim 4, wherein the driving system is configured for driving the endless conveyor preceding the exchange area of at least one of the disengagement processing stations in the transport direction at the corresponding speed being lower than one or more of the speeds different from the corresponding speed.

7. The bookbinding machine according to claim 4, wherein the transport elements comprise corresponding slits for receiving one of the conveying elements in succession, wherein each of the transport elements is engaged when one of the conveying elements moves transversally inside the corresponding slit thereby acting on the transport element and is disengaged otherwise, in each of the stop periods the transport elements being disengaged at the exchange areas each having one of the conveying elements stopped within the slit thereof.

8. The bookbinding machine according to claim 7, wherein the bookbinding machine comprises a guide for guiding the transport elements along the transport path, wherein the conveying elements comprise corresponding pegs integral with the endless conveyors and wherein the transport path is curved between at least one pair of common points wherein the transport path and a corresponding one of the endless conveyors coincide, between the pair of common points the endless conveyor comprising an internal portion of the active section thereof extending inside a corresponding external portion of the transport path, wherein each of the pegs of the endless conveyor slides along the slit of the transport element engaged by the peg thereby causing the transport element to move faster than the peg.

9. The bookbinding machine according to claim 4, wherein the bookbinding machine is a perfect binding machine, and wherein the engagement processing station is a cover application station for applying corresponding covers to the book blocks, the end exchange area of the endless conveyor corresponding to the cover application station being free of the processing stations.

10. The bookbinding machine according to claim 4, wherein the control unit is configured for adjusting the stop periods, the bookbinding machine comprising means for entering an indication of a processing period in the engagement processing station for one or more of the book blocks of a processing job and the control unit configured for setting the stop periods for the book blocks of the processing job to the processing period.

11. The bookbinding machine according to claim 4, wherein the control unit is configured for adjusting the moving periods, the bookbinding machine comprising means for entering an indication of a stop position in the engagement processing station of one or more of the book blocks of a further processing job and the control unit configured for adjusting the moving periods for the book blocks of the further processing job according to the stop position.

12. The bookbinding machine according to claim 4, wherein the bookbinding machine comprising means for measuring corresponding displacements of the book blocks at the engagement processing station in the stop periods and the control unit configured for calculating corresponding time adjustments for the conveying elements of the endless conveyor corresponding to the engagement processing station according to the displacements of the corresponding book blocks and to adjust the moving periods for each of the conveying elements reaching the engagement processing station according to the corresponding time adjustment.

13. The bookbinding machine according to claim 12, wherein the engagement processing station is a cover application station for applying corresponding covers to the book blocks, and wherein the bookbinding machine comprises means at the cover application station for measuring the displacement between the book block of each of the transport elements at the cover application station and the corresponding cover.

14. The bookbinding machine according to claim 4, wherein the control unit is configured for varying the speeds of the endless conveyors over time.

15. The bookbinding machine according to claim 4, wherein the bookbinding machine comprises means at the engagement processing station for measuring, in each of the stop periods, a displacement of the book block at a stop position in the engagement processing station before the processing thereof, the control unit being configured for controlling the driving system, in each of the stop periods, to adjust the stop position of the book block in the engagement processing station according to the displacement of the book for the processing thereof.

16. The bookbinding machine according to claim 1, wherein the processing stations comprise one or more movement processing stations for processing the book blocks while moving thereacross, the movement processing stations being arranged along at least one straight portion of the transport path for the active section of at least one of the endless conveyors.

17. The bookbinding machine according to claim 16, wherein the transport elements comprise corresponding slits for receiving one of the conveying elements in succession, and wherein at least one of the endless conveyors comprises an oblique portion at a corresponding one of the movement processing stations extending obliquely to the corresponding straight portion of the transport path, each of the conveying elements moving obliquely to the slit of the transport element being engaged by the conveying elements in the oblique portion thereby causing the transport element to move slower than the conveying element.

18. The bookbinding machine according to claim 1, wherein the processing stations are adapted to be driven individually.

19. A bookbinding plant comprising one or more bookbinding machines, wherein each of the bookbinding machines comprises:

a plurality of processing stations for processing book blocks, a plurality of transport elements for transporting the book blocks individually across the processing stations in a transport direction along a transport path having a closed shape, a plurality of endless conveyors arranged in a wrap-around succession, wherein corresponding exchange areas are defined at the transport path between pairs of adjacent ones of the endless conveyors, each of the endless conveyors carrying a number equal to one or more of conveying elements, the conveying elements being distributed uniformly along the corresponding endless conveyor when the conveying elements are more than one, and a driving system for driving the endless conveyors to cause each of the conveying elements of each of the endless conveyors in succession to engage one of the transport elements at a start exchange area of the exchange areas of the endless conveyor, to convey the transport element along the transport path for an active section of the endless conveyor from the start exchange area to an end exchange area of the exchange areas following the start exchange in along the transport direction, to disengage the transport element at the end exchange area of the endless conveyor, and to return free of the transport elements away from the transport path for a passive section of the endless conveyor from the end exchange area to the start exchange area thereof in the transport direction, wherein the driving system drives the endless conveyors at corresponding speeds each proportional to a ratio between a length of the corresponding endless conveyor and the number of the corresponding conveying elements according to a common moving frequency.

20. A method for operating a bookbinding machine, wherein the method comprises:

processing book blocks in a plurality of processing stations, transporting the book blocks individually across the processing stations in a transport direction along a transport path having a closed shape by a plurality of transport elements, driving a plurality of endless conveyors arranged in a wrap-around succession, wherein corresponding exchange areas are defined at the transport path between pairs of adjacent ones of the endless conveyors, each of the endless conveyors carrying a number equal to one or more of conveying elements, the conveying elements being distributed uniformly along the corresponding endless conveyor when the conveying elements are more than one, by a driving system to cause each of the conveying elements of each of the endless conveyors in succession to engage one of the transport elements at a start exchange area of the exchange areas of the endless conveyor, to convey the transport element along the transport path for an active section of the endless conveyor from the start exchange area to an end exchange area of the exchange areas following the start exchange area along the transport direction, to disengage the transport element at the end exchange area of the endless conveyor, and to return free of the transport elements away from the transport path for a passive section of the endless conveyor from the end exchange area to the start exchange area thereof in the transport direction, and driving the endless conveyors by the driving system at corresponding speeds each proportional to a ratio between a length of the corresponding endless conveyor and the number of the corresponding conveying elements according to a common moving frequency.

* * * * *